(12) United States Patent
Woodward et al.

(10) Patent No.: US 7,852,912 B2
(45) Date of Patent: Dec. 14, 2010

(54) DIRECT DETERMINATION EQUALIZER SYSTEM

(75) Inventors: Mark J. Woodward, Santa Rosa, CA (US); Marlin E. Viss, Santa Rosa, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 1046 days.

(21) Appl. No.: 11/090,383

(22) Filed: Mar. 25, 2005

(65) Prior Publication Data

US 2006/0215745 A1 Sep. 28, 2006

(51) Int. Cl.
*H03H 7/30* (2006.01)
*H03K 7/04* (2006.01)
*H03D 3/00* (2006.01)

(52) U.S. Cl. .................. 375/229; 375/239; 329/316
(58) Field of Classification Search .............. 375/229, 375/232, 350, 239; 329/316
See application file for complete search history.

(56) References Cited

U.S. PATENT DOCUMENTS

| | | | | |
|---|---|---|---|---|
| 5,159,282 A | * | 10/1992 | Serizawa et al. | 329/316 |
| 5,228,058 A | * | 7/1993 | Ushirokawa et al. | 375/232 |
| 5,282,155 A | * | 1/1994 | Jones | 708/322 |
| 5,317,595 A | * | 5/1994 | Ostman | 375/232 |
| 5,414,732 A | * | 5/1995 | Kaufmann | 375/232 |
| 5,517,213 A | * | 5/1996 | Bhatt et al. | 375/232 |
| 5,517,524 A | * | 5/1996 | Sato | 375/230 |
| 5,844,951 A | * | 12/1998 | Proakis et al. | 375/347 |
| 5,864,806 A | * | 1/1999 | Mokbel et al. | 704/234 |
| 6,301,298 B1 | * | 10/2001 | Kuntz et al. | 375/232 |
| 6,437,832 B1 | * | 8/2002 | Grabb et al. | 348/614 |
| 6,510,186 B1 | * | 1/2003 | Chen et al. | 375/343 |
| 6,560,278 B2 | * | 5/2003 | Kubo et al. | 375/232 |
| 6,937,648 B2 | * | 8/2005 | Raphaeli | 375/229 |
| 7,194,025 B2 | * | 3/2007 | Wood et al. | 375/231 |
| 7,245,676 B2 | * | 7/2007 | Yui | 375/343 |
| 2003/0152170 A1 | * | 8/2003 | Yousef | 375/340 |
| 2004/0174940 A1 | * | 9/2004 | Kim et al. | 375/340 |
| 2006/0015331 A1 | * | 1/2006 | Hui et al. | 704/227 |

FOREIGN PATENT DOCUMENTS

GB 2225883 6/1990

OTHER PUBLICATIONS

GB Search Report Under Section 17 dated Jun. 13, 2006.

* cited by examiner

*Primary Examiner*—Mohammad H Ghayour
*Assistant Examiner*—Sarah Hassan

(57) ABSTRACT

A direct determination equalizer system ("DDES") for compensating for the deterministic effects of a transmission channel and a data source is disclosed. The DDES may include an equalizer having equalizer-tap coefficients, a cross-correlator configured to receive the first sampled signal and an ideal signal and in response produce a cross-correlated signal, and a processor in signal communication with the equalizer and the cross-correlator. The equalizer is configured to receive a first sampled signal and in response produce an equalized output data signal sequence and the processor is configured to determine the equalizer-tap coefficients from the cross-correlated signal.

32 Claims, 7 Drawing Sheets

DIRECT DETERMINATION EQUALIZER SYSTEM

BACKGROUND OF THE INVENTION

In modern communication systems, high-speed digital signals are typically passed through transmission channels and/or media that are less than ideal. The transmission channel and/or media transmission characteristics may degrade a transmitted original digital signal to the point that a receiver is unable to accurately differentiate between a received zero and/or one in the received digital signal at the receiver. This problem is more acute for communication test systems that are utilized to test and characterize numerous types of electronic devices (generally known as "devices under test" or "DUTs") because on the need to accurately characterize the DUTs.

One approach to solve this problem includes compensating the deterministic effects introduced by sources such as frequency dependent losses and non-linear phase of the transmission medium, discontinuities from vias and connectors, periodic jitter, duty cycle distortion, etc., to correct the received digital signals using equalization so that the receiver may correctly receive the received digital signals. As an example of this approach, in FIG. 1, a block diagram of an example of an implementation of a known test system 100 is shown. The test system 100 may include a data source 102, transmission channel (i.e., the channel) 104, equalizer 106, and receiver 108. As an example of operation, the data source 102 may send a digital input signal 110 through the channel 104 to the equalizer 106. It is appreciated by those skilled in the art that the channel 104 is typically less than ideal and therefore usually degrades the digital input signal 110 based on the transmission characteristics of the channel 104. As a result, the channel output signal 112 is the digital input signal 110 degraded by the transmission characteristics of the channel 104. The equalizer 106 then receives the channel output signal 112 and equalizes the channel output signal 112 in an attempt to compensate for the transmission characteristics of the channel 104. The resulting equalized output signal 114 is then passed to the receiver 108.

Examples of the channel 104 in a typical test system 100 are shown in FIGS. 2 and 3. In FIG. 2, a block diagram of an example of an implementation of a known channel 200 in the test system of FIG. 1 is shown. In this example, the channel 200 may include an input cable 202 and an output cable 204. In FIG. 3, a block diagram of another example of an implementation of a known channel 300 in a test system is shown. In this second example, the channel 200 may include the input cable 202 and output cable 206 shown in FIG. 2 and a DUT 302. It is appreciated that by utilizing both implementations that the test system may be calibrated so as to measure the transmission characteristics of the DUT 302.

An example of a known equalizer 106 is shown in FIG. 4. A common type of equalizer is the linear feed-forward equalizer ("LFE"). The LFE is a finite impulse response ("FIR") linear filter. In FIG. 4, a block diagram of an example of an implementation of a known LFE 400 is shown. The LFE 400 may include a plurality of n time delays τ of equal length, an accumulator 402, a plurality of n tap coefficients K 404, and a low-pass filter ("LPF") 406. In an example of operation, the LFE 400 passes an input signal 408 through to both a tap coefficient $K_0$ 410 of the plurality of n tap coefficients K 404, via signal path 412, and the plurality of time delays 402 via signal path 414. The tap coefficient $K_0$ 410 is multiplied with the input signal 408 and the result is passed to the accumulator 402. Similarly, as the input signal 408 is passed through the plurality of time delays 402, the input signal 408 is time delayed by each time delay in the plurality of time delays 402 the resulting time delayed signals are multiplied with a corresponding tap coefficient (i.e., $K_1$, $K_2$, ..., $K_n$) of the plurality of n tap coefficients K 404. The corresponding results are then sent to the accumulator 402 that accumulates the results. The accumulated result 416 is the passed to the low-pass filter 406 which filters the accumulated result 416 and produces the equalized output 418.

Unfortunately, the typical design and evaluation of a high-speed digital transmission network with one or more LFEs 400 involves the derivation of the plurality of n tap coefficients K 404. It is appreciated by those skilled in the art that this usually requires a difficult formal derivation approach with technical expertise utilizing trial and error, inverse filter estimation from S-parameter or TDT channel characterization, or the iterative convergence algorithms of adaptive filters. Therefore, there is a need for a closed form method to determine the n tap coefficient K 404 values. Additionally, there is a need for a system capable of compensating for the deterministic effects of a channel and data source utilizing an LFE.

SUMMARY

A direct determination equalizer system ("DDES") for compensating for the deterministic effects of a transmission channel and a data source is disclosed. The DDES may include an equalizer, cross-correlator, and processor. The equalizer has equalizer-tap coefficients and may be configured to receive a first sampled signal and in response produce an equalized output data signal sequence. The cross-correlator may be configured to receive the first sampled signal and an ideal signal and in response produce a cross-correlated signal. The processor may be in signal communication with the equalizer and the cross-correlator, wherein the processor is configured to determine the equalizer-tap coefficients from the cross-correlated signal.

In an example of operation, the DDES may perform a process that includes acquiring a channel output data signal sequence spanning multiple bits, acquiring a channel output data signal sequence spanning multiple bits, determining an ideal data signal, cross-correlating the channel output data signal and the input data signal to produce a cross-correlation signal, determining the largest value of the cross-correlation signal, and determining equalizer-tap coefficients for the equalizer. Determining the equalizer-tap coefficients for the equalizer may include producing a set of linear equations based on the cross-correlation sequence, and solving the set of linear equations.

Other systems, methods and features of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

DETAILED DESCRIPTION

In the following description of the preferred embodiment, reference is made to the accompanying drawings that form a part hereof, and which show, by way of illustration, a specific embodiment in which the invention may be practiced. Other embodiments may be utilized and structural changes may be made without departing from the scope of the present invention.

In general, the invention is a direct determination feedback system ("DDES") that is capable of compensating for the deterministic effects of a transmission channel (i.e., a channel) and a data source. The DDES is capable of directly determining the equalizer coefficients needed to compensate for the deterministic effects of the channel by aligning and optimizing a received input data signal against an ideal data signal.

Figure 5:
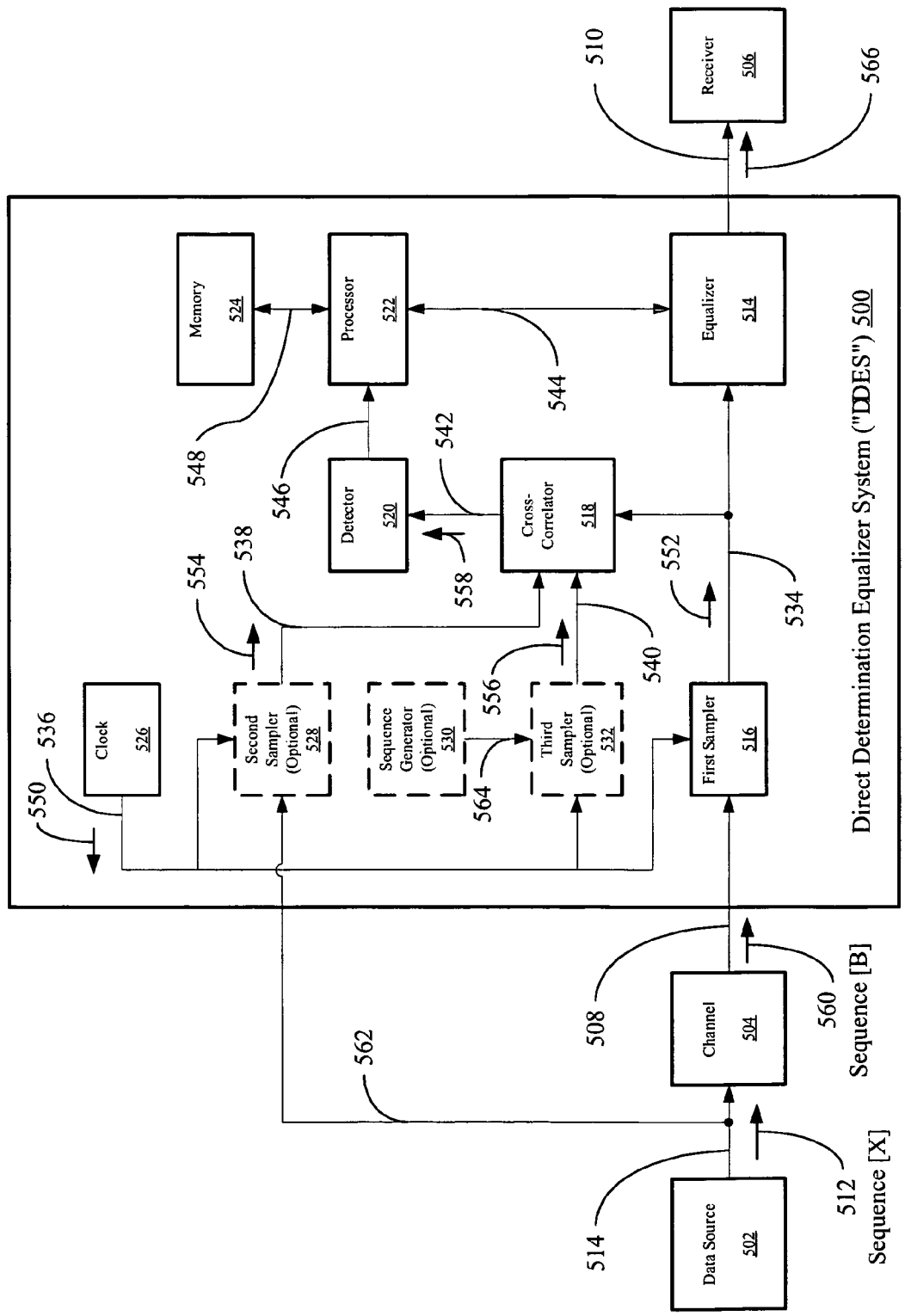
FIG. 5 is a block diagram of an example of an implementation of a direct determination equalizer system ("DDES").

In FIG. 5, a block diagram of an example of an implementation of a DDES 500 is shown. The DDES 500 may be in signal communication with a data source 502, through a channel 504, and a receiver 506 via signal paths 508 and 510, respectively. The data source 502 may produce an input data signal 512 that is transmitted to the channel 504 via signal path 514. The DDES 500 may include an equalizer 514, a first sampler 516, a cross-correlator 518, detector 520, processor 522, memory 524, clock 526, optional second sampler 528, optional sequence generator 530, and optional third sampler 532. The first sampler 516 may be in signal communication with the channel 504, the equalizer 514, and the clock 526 via signal paths 508, 534, and 536, respectively. The clock 526 may also be in signal communication with the optional second sampler 528 and the optional third sampler 532 via signal path 536. The cross-correlator 518 may be in communication with the first sampler 516, optional second sampler 528, optional third sampler 532, and detector 520, via signal paths 534, 538, 540, and 542, respectively. The processor 522 may be in signal communication with the equalizer 514, detector 520, and memory 524 via signal paths 544, 546, and 548, respectively.

The data source 502 is any data source capable of producing a digital data signal that is receivable by the receiver 506. As an example, the data source 502 and receiver 506 may be modules within an 86100C Digital Communications Analyzer produced by Agilent Technologies, Inc. of Palo Alto, Calif., a LECROYM1/ADV-1D Oscilloscope produced by LeCroy, Inc. of Chestnut Ridge, N.Y., a TDS8000B oscilloscope produced by Tektronix, Inc. of Beaverton, Oreg., SIA-3000 Oscilloscope produced by Wavecrest, Inc. of Eden Prairie, Minn., or similar devices.

The first sampler 516, optional second sampler 528, and optional third sampler 532 may be any type of device and/or module capable of converting continuous signals into discrete values (i.e., digital signals). The first sampler 516, optional second sampler 528, and optional third sampler 532 receive clock signals 550 from the clock 526 via signal path 536 and are optionally capable of sampling input signals at the same sampling rate.

The cross-correlator 518 may be any device and/or module capable of cross-correlating a received first sampled signal 552 from the first sampler 516, via signal path 534, and either a second sampled signal 554 from the optional second sampler 528, via signal path 538, or a third sampler signal 556 from the optional third sampler 532, via signal path 540. The cross-correlator 518 is capable of passing the resulting cross-correlated signal 558 to the detector 520 via signal path 542. The detector 520 may be any device and/or module capable of determining the largest value in the cross-correlation sequence of the cross-correlated signal 558.

The processor 522 may be any type of processor, microprocessor, microcontroller, controller, digital signal processor ("DSP"), application specific integrated circuit ("ASIC"), or programmable machine, or similar type of device and/or module. The memory 524 may be any type of storage device or module capable of storing data from the processor 522. The memory 524 may also store software capable of controlling the operation of the processor 522.

Figure 1:
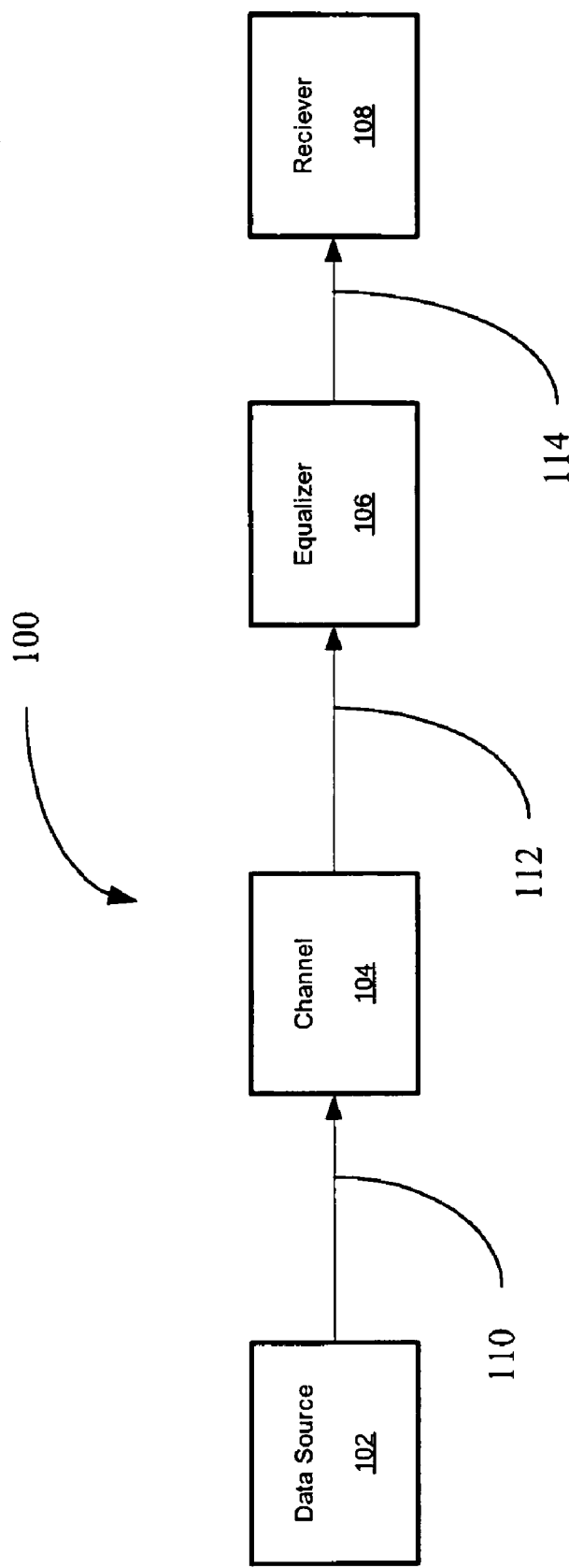
FIG. 1 is a block diagram of an example of an implementation of a known test system.
Figure 2:
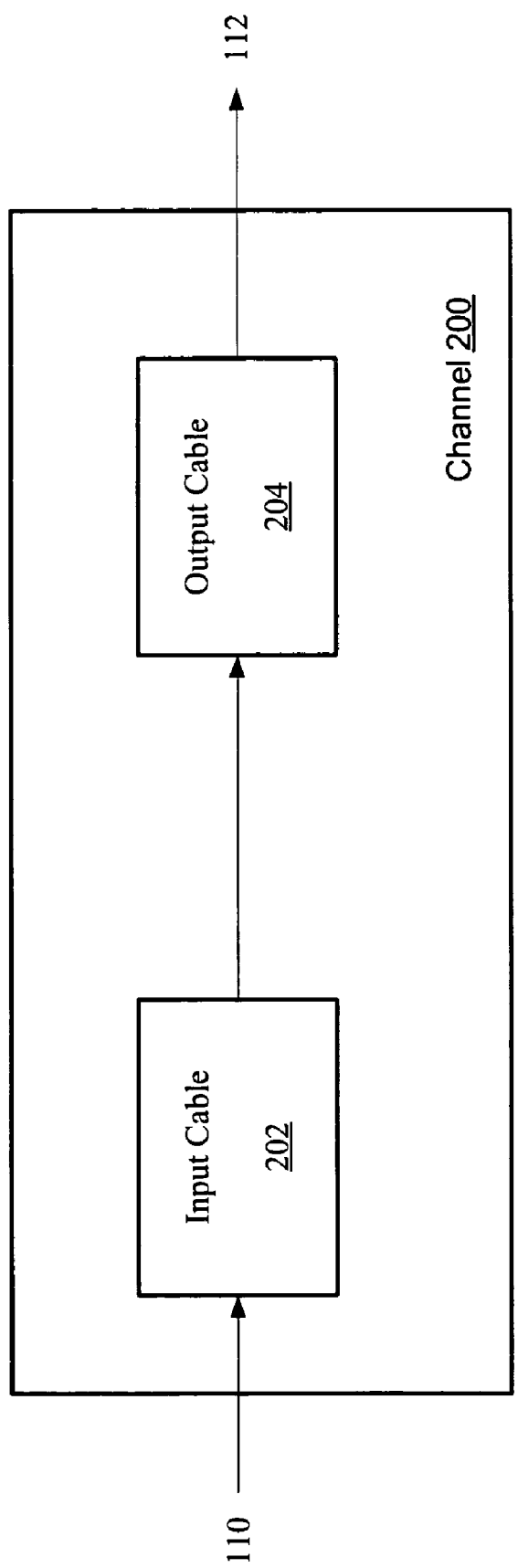
FIG. 2 is a block diagram of an example of an implementation of a known channel in the test system shown in FIG. 1.
Figure 3:
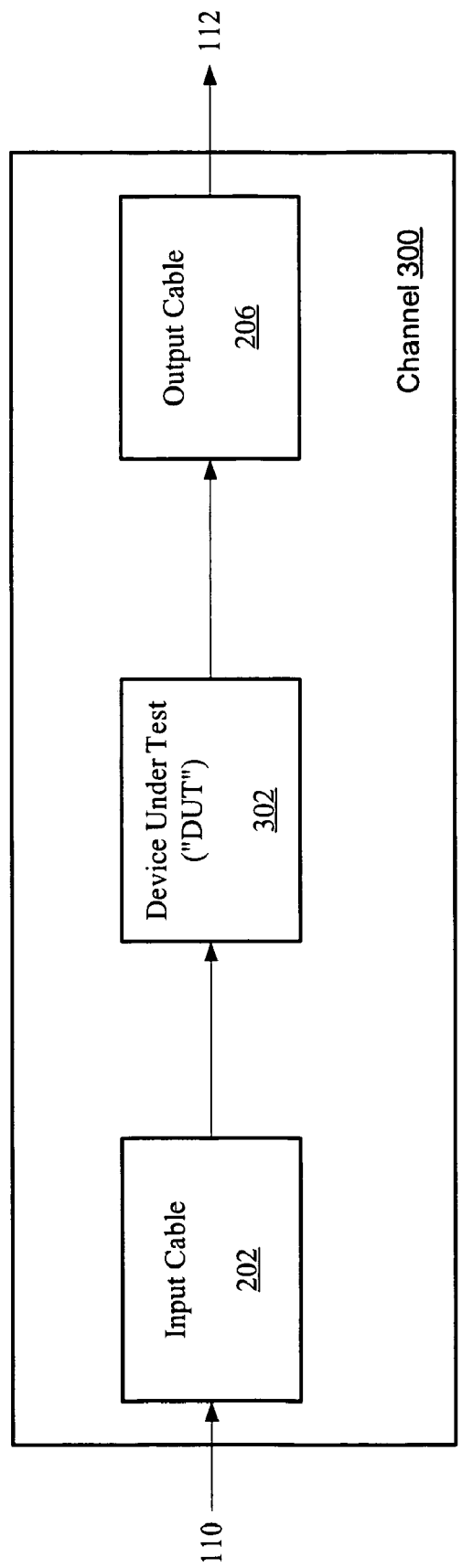
FIG. 3 is a block diagram of another example of an implementation of a known channel in a test system shown in FIG. 1.
Figure 4:
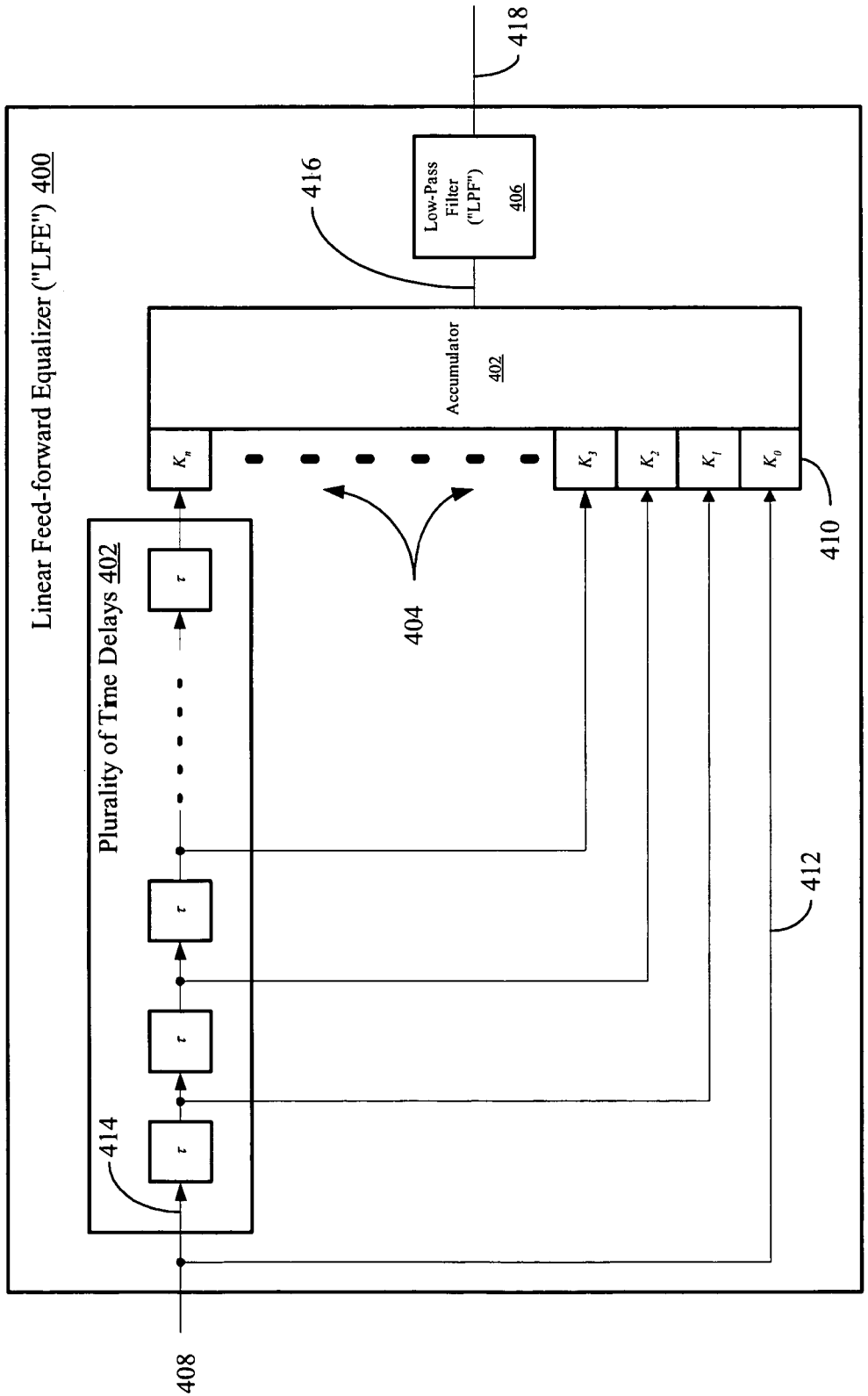
FIG. 4 is a block diagram of an example of an implementation of a known equalizer shown in FIG. 1.

The equalizer 514 may be a finite impulse response ("FIR") linear filter such as a linear feed-forward equalizer ("LFE") having equalizer-tap coefficients as shown in FIG. 1. The equalizer 514 is capable of reducing the inter-symbol interference ("ISI") from the combined channel 504 and DDES 500 impulse response.

In an example of operation, the DDES 500 is capable of directly determining the equalizer-tap coefficients of the equalizer 514 by compensating for the deterministic effects of a channel 504 by aligning and optimizing a received channel output data signal 560 against an ideal data signal. The ideal data signal may be optionally either the second sampler signal 554 or third sampler signal 556.

In general, the data source 502 transmits the input data signal 512 to the channel 504 and the channel 504 generally introduces a number of deterministic effects on the input data signal 512 based on the transmission characteristics of the channel 504. The resulting data signal produced by the channel 504 is the channel output data signal 560 that is passed to the DDES 500. It is appreciated by those skilled in the art that the input data signal 512 may represent a digital data sequence represented by sequence [X] and channel output data signal 560 may represent another digital data sequence represented by sequence [B]. The channel output data signal 560 may be acquired as a sequence [B] of samples spanning multiple bits at the channel 504 output. As an example, the DDES 500 may acquire the channel output data signal 560 sequence [B] utilizing a real-time oscilloscope function or an equivalent-time oscilloscope function triggering synchronously with a repeating pattern. The sequence [B] may be known as a "dirty" sequence.

The DDES 500 then determines a corresponding ideal data signal (i.e., "clean" sequence) corresponding to the input data signal 512 sequence [X] by either optionally directly sampling input data signal 512 sequence [X] in the same fashion as the channel output data signal 560 or by approximating the ideal data signal by determining an approximating sequence of logical bits corresponding to the channel output data signal 560 sequence [B] and constructing an unfiltered ideal data signal by sampling the approximating sequence at the same sampling rate as the first sampler 516. The DDES 500 may directly sample the input data signal 512 sequence [X] with the optional second sampler 528, which samples the input data signal 512 sequence [X] via signal path 562. The optional second sampler 528 utilizes the same clock signal 550 as the first sampler 516 to produce the same sampling rate. The second sampled signal 554 is then passed to the cross-correlator 518 via signal path 538.

Alternatively, the DDES 500 may approximate the ideal data signal by determining the approximating sequence 564 with the optional sequence generator 530. The sequence generator 530 may utilize a threshold module (not shown but either located internal to the optional sequence generator 530 or located external to the optional sequence generator 530 and within the DDES 500) capable of determining whether each bit in the channel output data signal 560 sequence [B] is either a zero or a one. Additionally, the sequence generator 530 may optionally receive a priori information about the input data signal 512 sequence [X] from the DDES 500.

The approximating sequence 564 is passed to the optional third sampler 532 which samples the approximating sequence 564 utilizing the same clock signal 550 as the first sampler 516 to produce the same sampling rate. The optional third sampler 532 may include a filter, such as, for example, a low-pass filter (not shown), capable of filtering the unfiltered ideal data signal to produce the third sampler output signal 556.

The first sampler 516 receives the channel output data signal 560, via signal path 508, and samples the channel output data signal 560 to produce the first sampled signal 552, which is passed to both the equalizer 514 and the cross-correlator 518 via signal path 534. The cross-correlator 518 then receives the first sampled signal 552 and the ideal data signal and produces the cross-correlated signal 558. By cross-correlating, the cross-correlator 518 determines and removes any time delays between the ideal data signal and the channel output data signal 560 sequence [B].

The detector 520 then receives the cross-correlated signal 558 and determines the largest value of the cross-correlated sequence and passes it and other information about the cross-correlated sequence to the processor 522 via signal path 546. The processor 522 then determines the equalizer-tap coefficients for the equalizer 514 by constructing and solving a set of linear equations based on the information from the detector 520, cross-correlator 518, and equalizer 514. The processor 522 then passes the equalizer-tap coefficients to the equalizer 514 and the equalizer 514 then uses these equalizer-tap coefficients to correct the channel output data signal 560 to produce an equalized output data signal 566 that is passed to the receiver 506 via signal path 510. It is appreciated by those skilled in the art that DDES 500 may include a switch module (not shown) capable of switching the DDES 500 from either directly sampling the input data signal 512 sequence [X] or approximating the ideal data signal. The switch module may be hardware and/or software and may be a part of the processor 522 or another component within the DDES 500.

Figure 6:
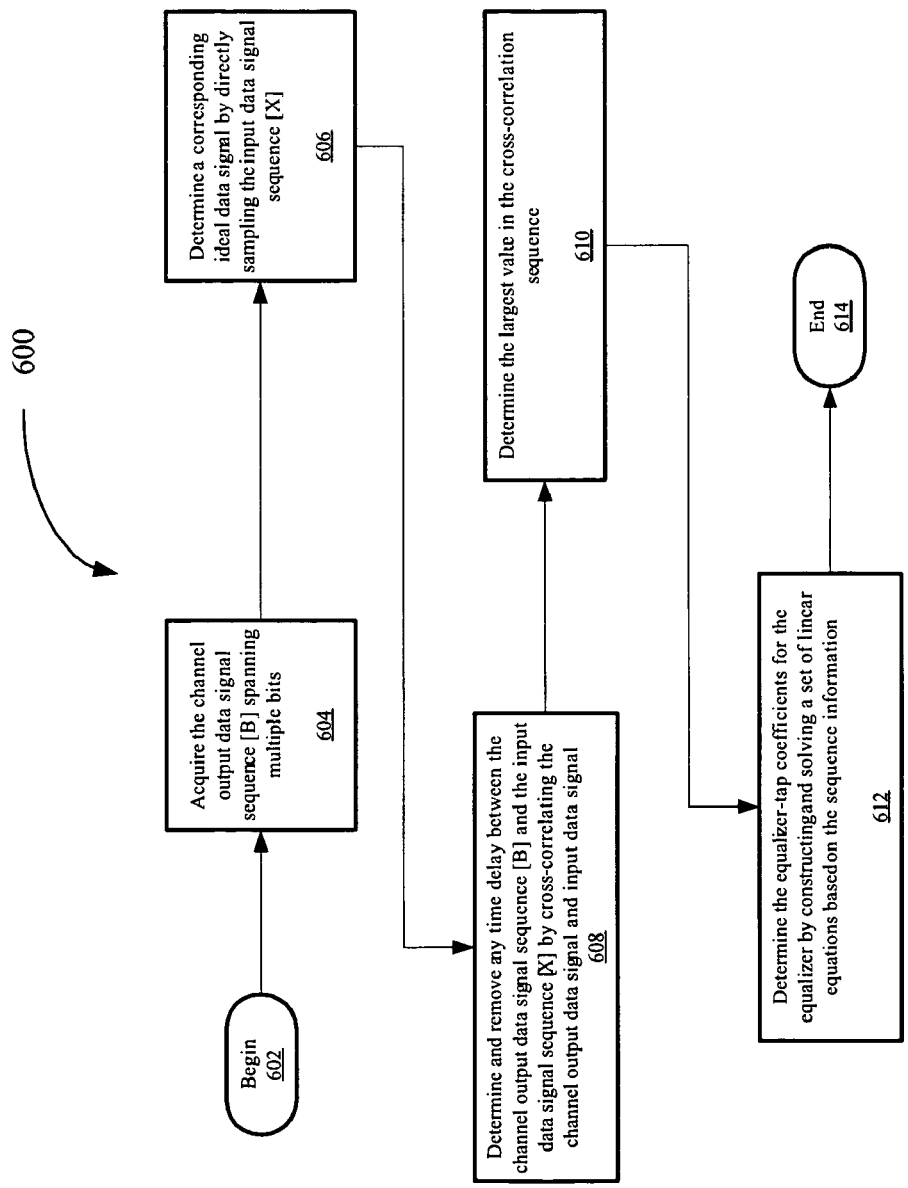
FIG. 6 is a flowchart of an example of a process preformed by the DDES shown in FIG. 5.
Figure 7:
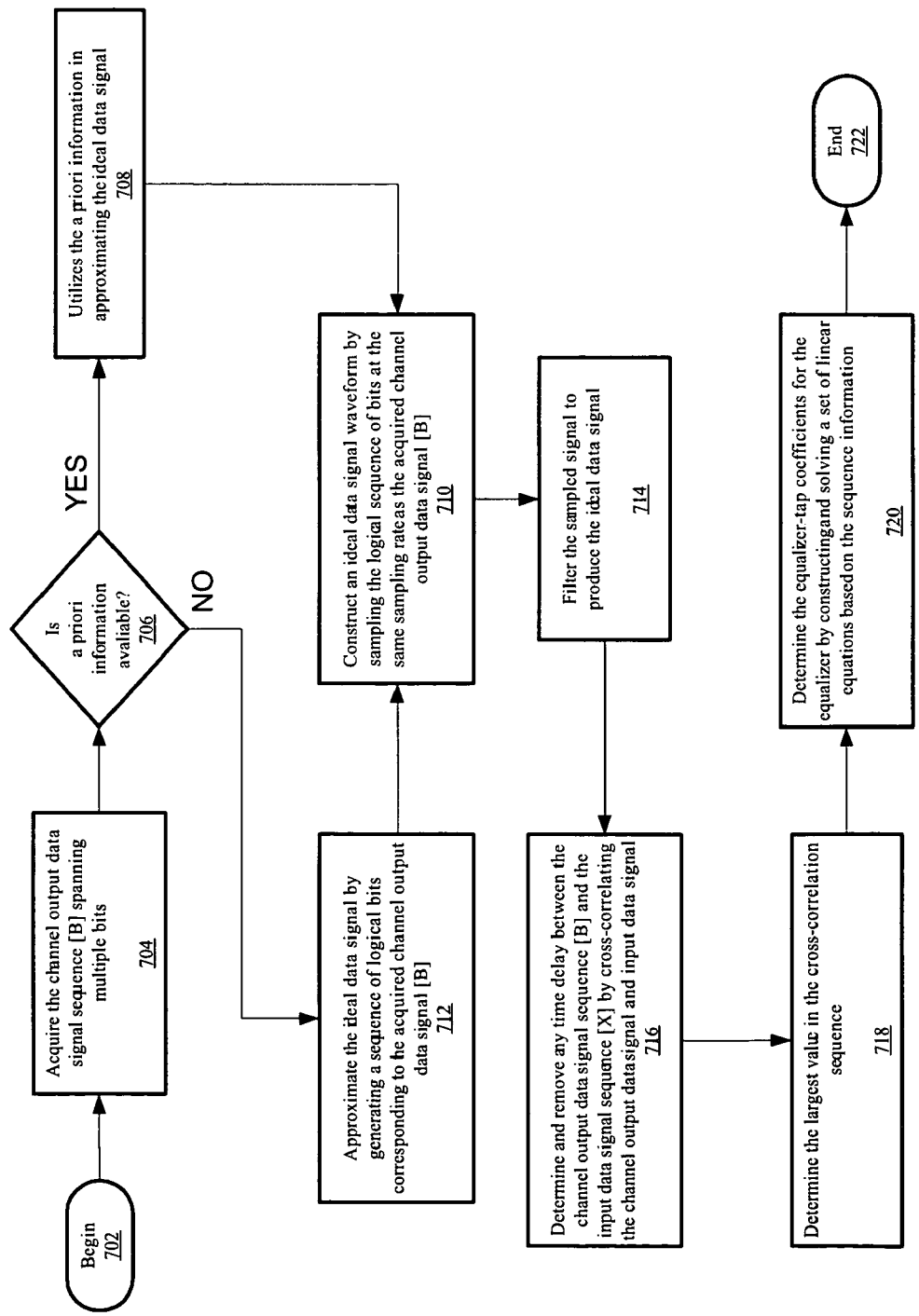
FIG. 7 is a flowchart of another example of a process preformed by the DDFES shown in FIG. 5.

FIGS. 6 and 7 describe examples of processes preformed by the DDES 500 in operation. In FIG. 6, a flowchart 600 of an example of a process performed by the DDES is shown. The process begins in step 602 and in step 604 the DDES acquires the channel output data signal sequence [B] spanning multiple bits. The DDES then determines a corresponding ideal data signal by directly sampling the input data signal sequence [X] in step 606. Then in step 608, the DDES determines and removes any time delay between the channel output data signal sequence [B] and the input data signal sequence [X] by cross-correlating the channel output data signal and input data signal. The cross-correlation relationship may be described by the following relationship:

$$\text{cross\_correlation}(k) = \sum_j \text{ideal\_data\_signal}(j) \cdot \text{channel\_output\_data\_signal}(k+j),$$

where the time delay between signals is indicated by the index j of the largest value of the cross-correlation sequence cross_correlation(k). The time delay may be removed by shifting the channel output data signal samples in the DDES according to: channel_output_data_signal(k)=channel_output_data_signal(k+i), where the index i is the shifting index.

The DDES then determines the largest value in the cross-correlation sequence in step 610 and in step 612 the DDES determines the equalizer-tap coefficients for the equalizer by constructing and solving a set of linear equations based on the sequence information.

The DDES may construct the set of linear equations utilizing the following relationship:

$$\text{ideal\_data\_signal}(k) = \sum_{i=0}^{numTaps-1} tap(i) \cdot \text{channel\_output\_data\_signal}(k - \text{round}(i \cdot (\tau \cdot f_s))),$$

where $\tau$ is the desired tap spacing and $f_s$ is the sampling rate. If the sequences of data are non-repeating, k may range from $(numTaps-1)*\text{round}(\tau*f_s)$ to the number of samples in the sequence, where numTaps−1 is the total number of equalizer taps in the equalizer 514. If instead, the sequences of data are repeating, there may be as many equations as there are samples in the sequence. As an example, the set of linear equations may be solved by standard multiple linear regression techniques. The process then ends in step 614.

Similarly in FIG. 7, a flowchart 700 of another example of a process preformed by the DDES is shown. The process begins in step 702 and in step 704 the DDES acquires the channel output data signal sequence [B] spanning multiple bits. The DDES then determines a corresponding ideal data signal. In decision step 706, if the DDES has a priori information of the ideal data signal, the DDES utilizes the a priori information in approximating the ideal data signal in step 708 and the process continues to step 710.

If instead, the DDES has no a priori information of the ideal data signal, the DDFES in step 712 approximates the ideal data signal by approximating the corresponding ideal data signal by generating a sequence of logical bits corresponding to the acquired channel output data signal [B]. The process then continues to step 710.

In step 710, the DDES constructs an ideal data signal waveform by sampling the logical sequence of bits at the same sampling rate as the acquired channel output data signal [B]. Then in step 714, the DDES may filter the sampled signal to produce the ideal data signal and the process continues to step 716.

Then in step 716, the DDES determines and removes any time delay between the channel output data signal sequence [B] and the input data signal sequence [X] by cross-correlating the channel output data signal and input data signal. The cross-correlation relationship may be described by the following relationship:

$$\text{cross\_correlation}(k) = \sum_j \text{ideal\_data\_signal}(j) \cdot \text{channel\_output\_data\_signal}(k+j),$$

where the time delay between signals is indicated by the index j of the largest value of the cross-correlation sequence cross_correlation(k). The time delay may be removed by shifting the channel output data signal samples in the DDES according to:

channel_output_data_signal(k)=channel_output_data_signal(k+i), where the index i is the shifting index.

The DDES then determines the largest value in the cross-correlation sequence in step 718 and in step 720 the DDES determines the equalizer-tap coefficients for the equalizer by constructing and solving a set of linear equations based on the sequence information.

The DDES may construct the set of linear equations utilizing the following relationship:

$$\text{ideal\_data\_signal}(k) = \sum_{i=0}^{numTaps-1} tap(i) \cdot \text{channel\_output\_data\_signal}(k - \text{round}(i \cdot (\tau \cdot f_s))),$$

where $\tau$ is the desired tap spacing and $f_s$ is the sampling rate. If the sequences of data are non-repeating, k may range from (numTaps−1)*round($\tau$*$f_s$) to the number of samples in the sequence. If instead, the sequences of data are repeating, there may be as many equations as there are samples in the sequence. As an example, the set of linear equations may be solved by standard multiple linear regression techniques. The process then ends in step 722.

Persons skilled in the art will understand and appreciate, that one or more processes, sub-processes, or process steps described in connection with FIGS. 6 and 7 may be performed by hardware and/or software. Additionally, the DDES 500 may be implemented completely in software that would be executed within a microprocessor, general purpose processor, combination of processors, DSP, and/or ASIC. If the process is performed by software, the software may reside in software memory (not shown) in the DDES 500. The software in software memory may include an ordered listing of executable instructions for implementing logical functions (i.e., "logic" that may be implemented either in digital form such as digital circuitry or source code or in analog form such as analog circuitry or an analog source such an analog electrical, sound or video signal), and may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "computer-readable medium" and/or "signal-bearing medium" is any means that may contain, store, communicate, propagate, or transport the program for use by or in connection with the instruction execution system, apparatus, or device. The computer readable medium may selectively be, for example but not limited to, an electronic, magnetic, optical, electromagnetic, infrared, or semiconductor system, apparatus, device, or propagation medium. More specific examples, but nonetheless a non-exhaustive list, of computer-readable media would include the following: an electrical connection (electronic) having one or more wires; a portable computer diskette (magnetic); a RAM (electronic); a read-only memory "ROM" (electronic); an erasable programmable read-only memory (EPROM or Flash memory) (electronic); an optical fiber (optical); and a portable compact disc read-only memory "CDROM" (optical). Note that the computer-readable medium may even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

While the foregoing description refers to the use of a DDES, the subject matter is not limited to such a system. Any equalization system that could benefit from the functionality provided by the components described above may be implemented in the DDES.

Moreover, it will be understood that the foregoing description of numerous implementations has been presented for purposes of illustration and description. It is not exhaustive and does not limit the claimed inventions to the precise forms disclosed. Modifications and variations are possible in light of the above description or may be acquired from practicing the invention. The claims and their equivalents define the scope of the invention.

What is claimed:

1. A method for compensating for the deterministic effects of a transmission channel on an input data signal provided by a data source to an input of the transmission channel; the method utilizing a direct determination equalizer system ("DDES") having an equalizer, the method comprising:

acquiring a channel output data signal, comprising a sequence spanning multiple bits from an output of the transmission channel;

determining an ideal data signal;

cross-correlating the channel output data signal and the ideal data signal to produce a cross-correlation sequence comprising a plurality of terms, each term in said cross-correlation sequence corresponding to a different delay between said channel output data signal and said ideal data signal;

determining the delay corresponding to the largest value of the cross-correlation sequence;

determining equalizer-tap coefficients for the equalizer, the equalizer-tap coefficients depending on the determined delay; and generating an equalized output data signal by applying the equalizer to an output of the transmission channel;

wherein determining the ideal data signal comprises sampling either the input data signal provided by the data source to the input of the transmission channel or the output data signal acquired from the output of the transmission channel to generate said ideal data signal.

2. The method of claim 1, wherein determining equalizer-tap coefficients for the equalizer includes:

producing a set of linear equations that depend linearly on the equalizer-tap coefficients based on the cross-correlation sequence, and solving the set of linear equations for the equalizer-tap coefficients.

3. The method of claim 2, wherein cross-correlating the channel output data signal and the ideal data signal utilizes the relationship $$\text{cross\_correlation}(k) = \sum_{j} \text{ideal\_data\_signal}(j) \cdot \text{channel\_output\_data\_signal}(k + j),$$

wherein "k" is a sequence index number and "j" is an index number of the largest value of the cross-correlation sequence "cross_correlation(k),"

wherein j indicates a time delay between channel output data signal "channel_output_data_signal" and the ideal data signal "ideal_data_signal" and wherein cross-correlating includes removing the time delay by shifting the channel output data signal "channel_output_data_signal" utilizing the relationship channel_output_data_signal(k)=channel_output_data_signal(k+i), wherein "k" is a sequence index number and "i" is a shifting index.

4. The method of claim 3,
wherein the set of linear equations is produced utilizing the relationship $$\text{ideal\_data\_signal}(k) = \sum_{i=0}^{numTaps-1} tap(i) \cdot channel\_output\_data\_signal(k - round(i \cdot (\tau \cdot f_s))),$$

wherein the ideal data signal is "ideal_data_signal(k)," the equalizer-tap coefficients are "tap(i)" and the channel output data signal is "channel_output_data_signal,"; and wherein "$\tau$" is the desired tap spacing "$f_s$" is the sampling rate, "k" is a sequence index number, "i" is an index number, and numTaps−1 is the total number of equalizer taps in the equalizer.

5. A method for compensating for the deterministic effects of a transmission channel on an input data signal provided by a data source to an input of the transmission channel; the method utilizing a direct determination equalizer system ("DDES") having an equalizer, the method comprising:

acquiring a channel output data signal sequence spanning multiple bits from an output of the transmission channel;
determining an ideal data signal;
cross-correlating the channel output data signal and the ideal data signal to produce a cross-correlated signal including a cross-correlation sequence;
determining the largest value of the cross-correlation sequence; and
determining equalizer-tap coefficients for the equalizer;
wherein determining an ideal data signal includes sampling either the data signal at the input of the transmission channel or the data signal at the output of the transmission channel to generate said ideal data signal.

6. The method of claim 1, wherein determining an ideal data signal includes approximating an ideal data signal with an approximating sequence.

7. A method for compensating for the deterministic effects of a transmission channel on an input data signal provided by a data source to an input of the transmission channel; the method utilizing a direct determination equalizer system ("DDES") having an equalizer, the method comprising:

acquiring a channel output data signal sequence spanning multiple bits from an output of the transmission channel;
determining an ideal data signal;
cross-correlating the channel output data signal and the ideal data signal to produce a cross-correlated signal including a cross-correlation sequence;
determining the largest value of the cross-correlation sequence; and
determining equalizer-tap coefficients for the equalizer;
wherein determining an ideal data signal includes sampling either the data signal at the input of the transmission channel or the data signal at the output of the transmission channel; and wherein determining an ideal data signal includes approximating an ideal data signal with an approximating sequence; and wherein acquiring a channel output data signal sequence includes sampling the acquired channel output data signal sequence at a sampling rate, and wherein approximating an ideal data signal includes:
determining a priori information for the ideal data signal;
generating the approximating sequence utilizing the a priori information; and
sampling a logical sequence of bits corresponding to the approximating sequence at the sampling rate to produce the ideal data signal.

8. The method of claim 7, wherein cross-correlating the channel output data signal and the ideal data signal utilizes the relationship $$\text{cross\_correlation}(k) = \sum_{j} \text{ideal\_data\_signal}(j) \cdot channel\_output\_data\_signal(k + j),$$

wherein "k" is a sequence index number and "j" is an index number of the largest value of the cross-correlated sequence "cross-correlation(k),"

wherein j indicates a time delay between the channel output data signal "channel_output_data_signal" and the ideal data signal "ideal_data_signal" and wherein cross-correlating includes removing the time delay by shifting the channel output data signal "channel_output_data_signal" utilizing the relationship channel_output_data_signal(k)=channel_output_data_signal(k+i), wherein "k" is a sequence index number and "i" is a shifting index.

9. The method of claim 8, wherein determining equalizer-tap coefficients for the equalizer includes:
producing a set of linear equations based on the cross-correlation sequence: and
solving the set of linear equations;
wherein the set of linear equations is produced utilizing the relationship $$\text{ideal\_data\_signal}(k) = \sum_{i=0}^{numTaps-1} tap(i) \cdot channel\_output\_data\_signal(k - round(i \cdot (\tau \cdot f_s))),$$

wherein the ideal data signal is "ideal_data_signal(k)," the equalizer-tap coefficients are "tap(i)," and the channel output data signal is "channel_output_data_signal,"; and wherein "$\tau$" is the desired tap spacing, "$f_s$" is the sampling rate, "k" is a sequence index number, "i" is an index number, and numTaps−1 is the total number of equalizer taps in the equalizer.

10. The method of claim 9, wherein approximating an ideal data signal further includes filtering the produced ideal data signal.

11. The method of claim 6,
wherein the approximating sequence has a sequence of logical bits;

wherein acquiring a channel output data signal sequence includes sampling the acquired channel output data signal sequence at a sampling rate, and wherein approximating an ideal data signal includes:

sampling the sequence of logical bits at the sampling rate to produce the ideal data signal.

12. The method of claim 11, wherein cross-correlating the channel output data signal and the ideal data signal utilizes the relationship $$\text{cross\_correlation}(k) = \sum_j \text{ideal\_data\_signal}(j) \cdot \text{channel\_output\_data\_signal}(k+j),$$

wherein "k" is a sequence index number and "j" is an index number of the largest value of the cross-correlated sequence "cross-correlation(k)"

wherein j indicates a time delay between channel output data signal "channel_output_data_signal" and the ideal data signal "ideal_data_signal_," and wherein cross-correlating includes removing the time delay by shifting the channel output data signal "channel_output_data_signal" utilizing the relationship channel_output_data_signal(k)=channel_output_data_signal(k+i), wherein "k" is a sequence index number and "i" is a shifting index.

13. The method of claim 12, wherein determining equalizer-tap coefficients for the equalizer includes:

producing a set of linear equations that depend linearly on the equalizer-tap coefficients based on the cross-correlation sequence, and solving the set of linear equations for the equalizer-tap coefficients;

wherein the set of linear equations is produced utilizing the relationship $$\text{ideal\_data\_signal}(k) = \sum_{i=0}^{numTaps-1} tap(i) \cdot \text{channel\_output\_data\_signal}(k - \text{round}(i \cdot (\tau \cdot f_s))),$$

wherein the ideal data signal is "ideal_data_signal(k)," the equalizer-tap coefficients are "tap(i)" and the channel output data signal is "channel_output_data_signal" and wherein "$\tau$" is the desired tap spacing "$f_s$" is the sampling rate, "k" is a sequence index number, "i" is an index number, and numTaps−1 is the total number of equalizer taps in the equalizer.

14. A direct determination equalizer system ("DDES") for compensating for the deterministic effects of a transmission channel receiving an input data signal sequence provided by a data source at an input of said channel and providing a corresponding output data signal at an output of said channel, the DDES comprising:

a first sampler that samples the output data signal to provide a first sampled signal;

an equalizer having equalizer-tap coefficients, wherein the equalizer is configured to receive the first sampled signal and in response produce an equalized output data signal sequence;

a second sampler that samples either the input data signal at the input of the transmission channel or the output data signal at the output of the transmission channel to provide an ideal signal;

a cross-correlator configured to receive the first sampled signal and the ideal signal and in response produce a cross-correlated signal; and a processor in signal communication with the equalizer and the cross-correlator, wherein the processor is configured to determine the equalizer-tap coefficients from the cross-correlated signal.

15. A direct determination equalizer system ("DDES") for compensating for the deterministic effects of a transmission channel receiving an input data signal sequence provided by a data source at an input of said channel and providing a corresponding output data signal at an output of said channel, the DDES comprising:

a first sampler that samples the output data signal to provide a first sampled signal;

an equalizer having equalizer-tap coefficients, wherein the equalizer is configured to receive the first sampled signal and in response produce an equalized output data signal sequence;

a second sampler that samples either the input data signal at the input of the transmission channel or the output data signal at the output of the transmission channel to provide an ideal signal;

a cross-correlator configured to receive the first sampled signal and the ideal signal and in response produce a cross-correlated signal;

a processor in signal communication with the equalizer and the cross-correlator, wherein the processor is configured to determine the equalizer-tap coefficients from the cross-correlated signal; and a clock in signal communication with both the first sampler and the second sampler, wherein the second sampler is configured to sample the input data signal sequence at the input of the transmission channel and produce the ideal signal;

wherein the clock is configured to produce a clock signal that is passed to the first sampler and the second sampler, and wherein the clock signal produces the sampling rate for both the first sampler and the second sampler.

16. The DDES of claim 15, further including a detector in signal communication with both the cross-correlator and the processor, wherein the detector is configured to determine the largest value of the cross-correlation sequence.

17. A direct determination equalizer system ("DDES") for compensating for the deterministic effects of a transmission channel receiving an input data signal sequence provided by a data source at an input of said channel and providing a corresponding output data signal at an output of said channel, the DDES comprising:

a first sampler that samples the output data signal to provide a first sampled signal;

an equalizer having equalizer-tap coefficients, wherein the equalizer is configured to receive the first sampled signal and in response produce an equalized output data signal sequence;

a second sampler that samples either the input data signal at the input of the transmission channel or the output data signal at the output of the transmission channel to provide an ideal signal;

a cross-correlator configured to receive the first sampled signal and the ideal signal and in response produce a cross-correlated signal;

a processor in signal communication with the equalizer and the cross-correlator, wherein the processor is configured to determine the equalizer-tap coefficients from the cross-correlated signal;

a sequence generator configured to produce an approximating sequence wherein the approximating sequence approximates the ideal data signal; and a third sampler in signal communication with both the sequence generator and the cross-correlator, wherein the third sampler is configured to sample the approximating sequence to produce the ideal signal; and a clock in signal communication with both the first sampler and the third sampler, wherein the clock is configured to produce a clock signal that is passed to the first sampler and the third sampler, and wherein the clock signal produces the sampling rate for both the first sampler and the third sampler.

18. The DDES of claim 17, wherein the sequence generator includes a threshold module.

19. The DDES of claim 18, further including a filter in signal communication with both the third sampler and the cross-correlator, wherein the filter is configured to filter the sampled approximating sequence to produce the ideal signal.

20. A computer-readable medium having software comprising instructions executable for compensating for the deterministic effects of a transmission channel on an input data signal provided by a data source to an input of the transmission channel, said compensating utilizing a direct determination equalizer system ("DDES") having an equalizer, the medium comprising:

logic configured for acquiring a channel output data signal comprising a sequence spanning multiple bits from an output of the transmission channel;

logic configured for determining an ideal data signal;

logic configured for cross-correlating the channel output data signal and the ideal data signal to produce a cross-correlation sequence comprising a plurality of terms, each term in said cross-correlation sequence corresponding to a different delay between said channel output data signal and said ideal data signal;

logic configured for determining the delay corresponding to the largest value of the cross-correlation sequence;

logic configured for determining equalizer-tap coefficients for the equalizer, the equalizer-tap coefficients depending on the determined delay; and logic configured for generating an equalized output data signal by applying the equalizer to an output of the transmission channel, wherein determining the ideal data signal comprises sampling either the input data signal provided by the data source to the input of the transmission channel or the output data signal acquired from the output of the transmission channel to generate said ideal data signal.

21. The computer-readable medium of claim 20, wherein the logic configured for determining the equalizer-tap coefficients for the equalizer includes:

logic configured for producing a set of linear equations a set of linear equations that depend linearly on the equalizer-tap coefficients based on the cross-correlation sequence, and logic configured for solving the set of equations for the equalizer-tap coefficients.

22. The computer-readable medium of claim 21, wherein the logic configured for cross-correlating the channel output data signal and the ideal data signal utilizes the relationship $$\text{cross\_correlation}(k) = \sum_j \text{ideal\_data\_signal}(j) \cdot \text{channel\_output\_data\_signal}(k+j),$$

wherein "k" is a sequence index number and "j" is an index number of the largest value of the cross-correlation sequence "cross_correlation(k)," and wherein j indicates a time delay between channel output data signal "channel_output_data_signal" and the ideal data signal "ideal_data_signal" and wherein the logic configured for cross-correlating includes removing the time delay by shifting the channel output data signal "channel_output_data_signal" utilizing the relationship channel_output_data_signal(k)=channel_output_data_signal(k+I), wherein "k" is a sequence index number and "i" is a shifting index.

23. The computer-readable medium of claim 22, wherein the logic configured for determining equalizer-tap coefficients for the equalizer includes:

logic configured for producing a set of linear equations based on the cross-correlation sequence; and logic configured for solving the set of linear equations;

wherein the set of linear equations are produced utilizing the relationship $$\text{ideal\_data\_signal}(k) = \sum_{i=0}^{numTaps-1} \text{tap}(i) \cdot \text{channel\_output\_data\_signal}(k - \text{round}(i \cdot (\tau \cdot f_s))),$$

wherein the ideal data signal is "ideal_data_signal(k)," the equalizer-tap coefficients are "tap(i)" and the channel output data signal is "channel_output_data_signal" and wherein "$\tau$" is the desired tap spacing, "$f_s$" is the sampling rate, "k" is a sequence index number, "i" is an index number, and numTaps−1 is the total number of equalizer taps in the equalizer.

24. A computer-readable medium having software comprising instructions executable for compensating for the deterministic effects of a transmission channel on an input data signal provided by a data source to an input of the transmission channel, said compensating utilizing a direct determination equalizer system ("DDES") having an equalizer, the medium comprising:

logic configured for acquiring a channel output data signal sequence spanning multiple bits from an output of the transmission channel;

logic configured for determining an ideal data signal;

logic configured for cross-correlating the channel output data signal and the ideal data signal to produce a cross-correlation signal having a cross-correlation sequence;

logic configured for determining the largest value of the cross-correlation sequence; and logic configured for determining equalizer-tap coefficients for the equalizer;

wherein determining an ideal data signal includes sampling either the data signal at the input of the transmission channel or the data signal at the output of the transmission channel to generate said ideal data signal; and wherein the logic configured for determining the equalizer-tap coefficients for the equalizer includes:

logic configured for producing a set of linear equations based on the cross-correlation sequence; and logic configured for solving the set of linear equations; and wherein the logic configured for solving includes logic configured for solving the set of linear equations utilizing linear regression.

25. A computer-readable medium having software comprising instructions executable for compensating for the deterministic effects of a transmission channel on an input data signal provided by a data source to an input of the transmission channel, said compensating utilizing a direct determination equalizer system ("DDES") having an equalizer, the medium comprising:
    logic configured for acquiring a channel output data signal sequence spanning multiple bits from an output of the transmission channel;
    logic configured for determining an ideal data signal;
    logic configured for cross-correlating the channel output data signal and the ideal data signal to produce a cross-correlation signal having a cross-correlation sequence;
    logic configured for determining the largest value of the cross-correlation sequence; and
    logic configured for determining equalizer-tap coefficients for the equalizer;
    wherein determining an ideal data signal includes sampling either the data signal at the input of the transmission channel or the data signal at the output of the transmission channel; and
    wherein the logic configured for determining an ideal data signal includes logic configured for determining an ideal data signal by sampling the input data signal at the input of the transmission channel to generate said ideal data signal.

26. The computer-readable medium of claim 20, wherein the logic configured for determining the ideal data signal includes logic configured for approximating the ideal data signal with an approximating sequence.

27. A computer-readable medium having software comprising instructions executable for compensating for the deterministic effects of a transmission channel on an input data signal provided by a data source to an input of the transmission channel, said compensating utilizing a direct determination equalizer system ("DDES") having an equalizer, the medium comprising:
    logic configured for acquiring a channel output data signal sequence spanning multiple bits from an output of the transmission channel;
    logic configured for determining an ideal data signal;
    logic configured for cross-correlating the channel output data signal and the ideal data signal to produce a cross-correlation signal having a cross-correlation sequence;
    logic configured for determining the largest value of the cross-correlation sequence; and
    logic configured for determining equalizer-tap coefficients for the equalizer;
    wherein determining an ideal data signal includes sampling either the data signal at the input of the transmission channel or the data signal at the output of the transmission channel; and
    wherein the logic configured for determining the ideal data signal includes logic configured for approximating the ideal data signal with an approximating sequence; and
    wherein the logic configured for acquiring a channel output data signal sequence includes logic configured for sampling the acquired channel output data signal sequence at a sampling rate, and wherein the logic configured for approximating the ideal data signal includes:
        logic configured for determining a priori information for the ideal data signal;
        logic configured for generating the approximating sequence utilizing the a priori information; and
        logic configured for sampling a logical sequence of bits corresponding to the approximating sequence at the sampling rate to produce the ideal data signal.

28. The computer-readable medium of claim 27, wherein the logic configured for cross-correlating the channel output data signal and the ideal data signal utilizes the relationship $$\text{cross\_correlation}(k) = \sum_j \text{ideal\_data\_signal}(j) \cdot \text{channel\_output\_data\_signal}(k+j),$$

wherein "k" is a sequence index number and "j" is an index number of the largest value of the cross-correlation sequence "cross-correlation(k),"
    wherein j indicates a time delay between channel output data signal "channel_output_data_signal" and the ideal data signal "ideal_data_signal," and
    wherein the logic configured for cross-correlating includes logic configured for removing the time delay by shifting the channel output data signal "channel_output_data_signal" utilizing the relationship channel_output_data_signal(k)=channel_output_data_signal(k+i),
    wherein "k" is a sequence index number and "i" is a shifting index.

29. The computer-readable medium of claim 28, wherein the logic configured for determining equalizer-tap coefficients for the equalizer includes:
    logic configured for producing a set of linear equations based on the cross-correlation sequence; and
    logic configured for solving the set of linear equations;
    wherein the set of linear equations are produced utilizing the relationship $$\text{ideal\_data\_signal}(k) = \sum_{i=0}^{\text{numTaps}-1} \text{tap}(i) \cdot \text{channel\_output\_data\_signal}(k - \text{round}(i \cdot (\tau \cdot f_s))),$$

wherein the ideal data signal is "ideal_data_signal(k)," the equalizer-tap coefficients are "tap(i)," and the channel output data signal is "channel_output_data_signal," and
    wherein "τ" is the desired tap spacing, "$f_s$" is the sampling rate, "k" is a sequence index number, "i" is an index number, and numTaps−1 is the total number of equalizer taps in the equalizer.

30. The computer-readable medium of claim 26, wherein the logic configured for acquiring a channel output data signal sequence includes logic configured for sampling the acquired channel output data signal sequence at a sampling rate, and wherein the logic configured for approximating the ideal data signal includes;
    logic configured for generating the approximating sequence corresponding to the acquired channel output data signal, the approximating sequence having a sequence of logical bits; and
    logic configured for sampling the sequence of logical bits at the sampling rate to produce the ideal data signal.

31. The computer-readable medium of claim 30, wherein the logic configured for cross-correlating the channel output data signal and the ideal data signal utilizes the relationship $$\text{cross\_correlation}(k) = \sum_j \text{ideal\_data\_signal}(j) \cdot \text{channel\_output\_data\_signal}(k+j),$$

wherein "k" is a sequence index number and "j" is an index number of the largest value of the cross-correlated signal "cross_correlation(k),"

wherein j indicates a time delay between channel output data signal "channel_output_data_signal" and the ideal data signal "ideal_data_signal," and wherein the logic configured for cross-correlating includes logic configured for removing the time delay by shifting the channel output data signal "channel_output_data_signal" utilizing the relationship channel_output_data_signal(k)=channel_output_data_signal(k+1)

wherein "k" is a sequence index number and "i" is a shifting index.

32. The computer-readable medium of claim 31, wherein the logic configured for determining equalizer-tap coefficients for the equalizer includes:

logic configured for producing a set of linear equations that depend linearly on the equalizer-tap coefficients based on the cross-correlation sequence, and logic configured for solving the set of linear equations for the equalizer-tap coefficients;

wherein the set of linear equations are produced utilizing the relationship $$\text{ideal\_data\_signal}(k) = \sum_{i=0}^{numTaps-1} \text{tap}(i) \cdot \text{channel\_output\_data\_signal}(k - \text{round}(i \cdot (\tau \cdot f_s))),$$

wherein the ideal data signal is "ideal_data_signal(k)," the equalizer-tap coefficients are "tap(i)" and the channel output data signal is "channel_output_data_signal," and wherein "$\tau$" is the desired tap spacing, "$f_s$" is the sampling rate, "k" is a sequence index number, "i" is an index number, and Taps-1 is the total number of equalizer-taps in the equalizer.

\* \* \* \* \*

UNITED STATES PATENT AND TRADEMARK OFFICE
CERTIFICATE OF CORRECTION

| | | |
|---|---|---|
| PATENT NO. | : 7,852,912 B2 | Page 1 of 1 |
| APPLICATION NO. | : 11/090383 | |
| DATED | : December 14, 2010 | |
| INVENTOR(S) | : Mark J. Woodward et al. | |

It is certified that error appears in the above-identified patent and that said Letters Patent is hereby corrected as shown below:

In column 8, line 24, in Claim 1, delete "channel;" and insert -- channel: --, therefor.

In column 8, line 25, in Claim 1, delete "signal;" and insert -- signal: --, therefor.

In column 8, line 32, in Claim 1, delete "signal;" and insert -- signal: --, therefor.

In column 9, line 34, in Claim 5, delete "channel;" and insert -- channel: --, therefor.

In column 9, line 35, in Claim 5, delete "signal;" and insert -- signal: --, therefor.

In column 9, line 38, in Claim 5, delete "sequence;" and insert -- sequence: --, therefor.

In column 13, line 34, in Claim 20, delete "signal;" and insert -- signal: --, therefor.

In column 15, line 63, in Claim 27, delete "includes:" and insert -- includes; --, therefor.

Signed and Sealed this
Nineteenth Day of April, 2011

David J. Kappos
*Director of the United States Patent and Trademark Office*